(12) United States Patent
Eden et al.

(10) Patent No.: US 12,436,443 B2
(45) Date of Patent: Oct. 7, 2025

(54) LIGHT GENERATION AND DISTRIBUTION METHODS AND SYSTEMS FOR DISINFECTION, MEDICAL THERAPEUTICS, AND LIGHTING

(71) Applicant: The Board of Trustees of the University of Illinois, Urbana, IL (US)

(72) Inventors: J. Gary Eden, Mahomet, IL (US); Andrey Mironov, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 257 days.

(21) Appl. No.: 17/683,921

(22) Filed: Mar. 1, 2022

(65) Prior Publication Data

US 2022/0283476 A1    Sep. 8, 2022

Related U.S. Application Data

(60) Provisional application No. 63/156,024, filed on Mar. 3, 2021.

(51) Int. Cl.
| | |
|---|---|
| *G02F 1/37* | (2006.01) |
| *A61L 2/10* | (2006.01) |
| *A61L 2/24* | (2006.01) |
| *A61N 5/06* | (2006.01) |
| *A61N 5/067* | (2006.01) |
| *G02F 1/35* | (2006.01) |
| *H01S 5/00* | (2006.01) |
| *H01S 5/30* | (2006.01) |

(52) U.S. Cl.
CPC .......... *G02F 1/37* (2013.01); *A61L 2/10* (2013.01); *A61L 2/24* (2013.01); *A61N 5/0616* (2013.01);
(Continued)

(58) Field of Classification Search
CPC ... A61L 2202/25; A61N 5/067; A61N 5/0616; A61N 5/0621; G02F 1/37
See application file for complete search history.

(56) References Cited

U.S. PATENT DOCUMENTS

| | | | | |
|---|---|---|---|---|
| 4,152,752 A | * | 5/1979 | Niemi | F21S 2/00 |
| | | | | 362/147 |
| 4,844,069 A | * | 7/1989 | Mori | A61N 5/06 |
| | | | | 362/147 |

(Continued)

FOREIGN PATENT DOCUMENTS

| | | |
|---|---|---|
| KR | 20200110673 A | 9/2020 |
| WO | 2020203754 A1 | 10/2020 |

OTHER PUBLICATIONS

De Abajo et al., "Back to Normal: An Old Physics Route to Reduce SARS-COV-2 Transmission in Indoor Spaces", ACS Nano, 2020, pp. 7704-7713, vol. 14, No. 7, ACS Publications.

(Continued)

*Primary Examiner* — Rhonda S Peace
(74) *Attorney, Agent, or Firm* — Greer, Burns & Crain, Ltd.; Steven P. Fallon

(57) ABSTRACT

A light generation and light distribution method. The method includes generating laser light with a semiconductor laser or an array of semiconductor lasers at a generation location. Light generated by the semiconductor laser is guided to a frequency converter. Light converted by the frequency converter is directed to a plurality of distribution locations. The distribution locations can be remote or local. A light generation and light distribution system includes a semiconductor laser or array of lasers at a generation location. A frequency-conversion optical component modifies the wavelength of the radiation generated by the semiconductor laser to one or more desired wavelengths for disinfection, medical therapy, photochemical processes, and/or lighting. Light extraction and distribution optical components extract from the distribution system a portion of the light in the system so as to provide for one or more of disinfection, medical (Continued)

therapies, general or background lighting, and photochemical processes.

28 Claims, 9 Drawing Sheets

(52) U.S. Cl.
CPC ........... *A61N 5/0621* (2013.01); *A61N 5/067* (2021.08); *G02F 1/353* (2013.01); *H01S 5/0092* (2013.01); *H01S 5/3013* (2013.01); *A61L 2202/11* (2013.01); *A61L 2202/14* (2013.01); *A61L 2202/25* (2013.01); *A61N 2005/063* (2013.01); *A61N 2005/0651* (2013.01); *A61N 2005/0663* (2013.01)

(56) References Cited

U.S. PATENT DOCUMENTS

| | | | | |
|---|---|---|---|---|
| 5,371,660 | A * | 12/1994 | Levens | ............ F21S 2/00 362/373 |
| 10,064,968 | B2 * | 9/2018 | Statham | ............ G01J 1/429 |
| 10,866,484 | B2 * | 12/2020 | Lin | ............ G02F 1/3553 |
| 2006/0013533 | A1 * | 1/2006 | Slatkine | ............ A61B 90/04 385/31 |
| 2007/0106284 | A1 * | 5/2007 | Siegel | ............ A61N 5/0616 606/7 |
| 2020/0073199 | A1 | 3/2020 | Lin et al. | |
| 2020/0309703 | A1 | 10/2020 | Luk et al. | |
| 2020/0353112 | A1 | 11/2020 | Randers-Pehrson et al. | |
| 2022/0283476 | A1 * | 9/2022 | Eden | ............ H01S 5/0092 |

OTHER PUBLICATIONS

Fukui et al., "Exploratory clinical trial on the safety and bactericidal effect of 222-nm ultraviolet C irradiation in healthy humans", PLOS One, 2020, pp. 1-9, vol. 15, No. 8, PLOS.

Sabino et al., "Light-based technologies for management of COVID-19 pandemic crisis", Journal of Photochemistry & Photobiology, B: Biology, 2020, pp. 1-8, vol. 212, Elsevier B.V.

Siddiqui et al., "SARS-COV-2: Disinfection Strategies to Prevent Transmission of Neuropathogens via Air Conditioning Systems", ACS Chemical Neuroscience, 2020, pp. 3177-3179, vol. 11, No. 20, ACS Publications.

* cited by examiner

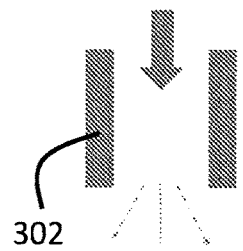
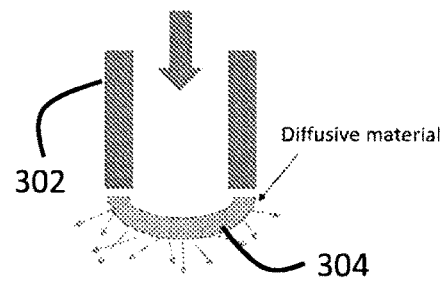
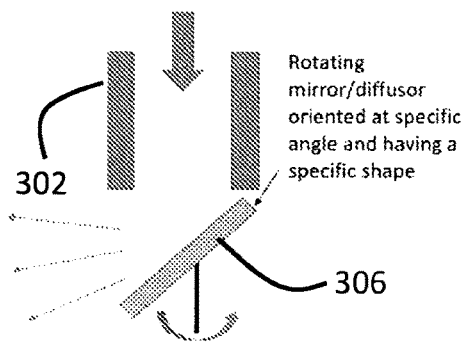
FIG. 3A     FIG. 3B     FIG. 3C
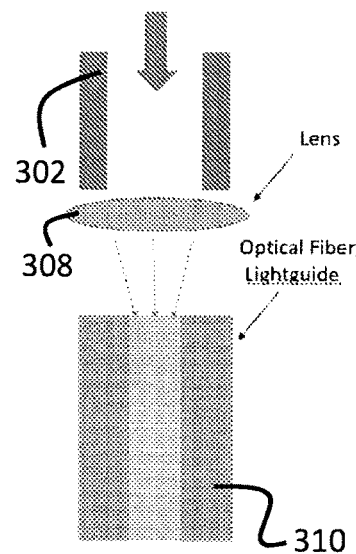
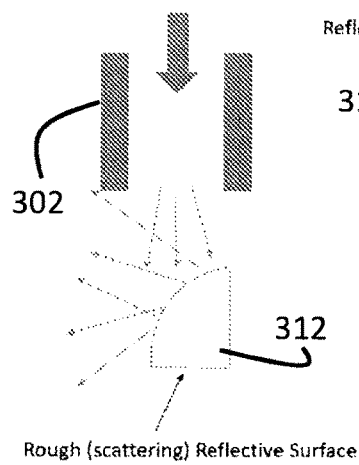
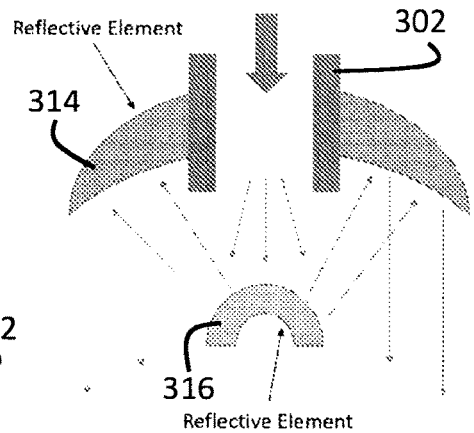
FIG. 3D     FIG. 3E     FIG. 3F

LIGHT GENERATION AND DISTRIBUTION METHODS AND SYSTEMS FOR DISINFECTION, MEDICAL THERAPEUTICS, AND LIGHTING

PRIORITY CLAIM AND REFERENCE TO RELATED APPLICATION

The application claims priority under 35 U.S.C. § 119 and all applicable statutes and treaties from prior U.S. provisional application Ser. No. 63/156,024 which was filed Mar. 3, 2021.

FIELD

Fields of the invention include ultraviolet light-based disinfection systems, ultraviolet light distribution components and systems, and phototherapeutics. Additional fields of the invention include light distribution building systems, and ultraviolet-light distribution in commercial buildings (office, retail, and industrial), schools, hotels, aircraft, airports, and ships.

BACKGROUND

Since the onset of the SARS-CoV-2 pandemic, ultraviolet (UV) light-based disinfection has become of increasing interest for deactivating the COVID-19 virus and other pathogens. Various devices and systems have been proposed and deployed in hospitals and residential settings, including germicidal lamps mounted on robots and mercury (254 nm) lamps installed within or near air ducts.

One example of the latter is Siddiqui et al, "SARS-CoV-2: Disinfection Strategies to Prevent Transmission of Neuropathogens via Air Conditioning Systems," CS Chem. Neurosci. 2020, 11, 20, 3177-3179. This system includes provision for particle filtration and UV radiation at one or more air intakes associated with an HVAC system, and seeks to avoid the introduction of pathogens into the HVAC system at the points of entry. Similar disinfection systems have existed for decades and, unfortunately, do not provide a complete solution for the introduction of pathogens into a building or other enclosed space by humans or any other source. In particular, pathogens such as COVID-19 must be deactivated quickly once introduced into a room or other enclosed space, as opposed to routing the infected air to the HVAC system. Furthermore, although existing HVAC-based UV disinfection systems provide a degree of disinfection, all such systems are based on mercury lamps (broadband arc lamps or the narrowband 254 nm lamp) which are undesirable from an environmental standpoint and are frequently less effective than UV sources emitting at other wavelengths. Of equal importance is the delay time associated with the extraction of a volume of air from any room in the building, disinfecting the air at the entry to an air duct, routing the air through the HVAC duct network, and returning air to the appropriate rooms. That is, a trade-off generally exists between the degree of disinfection of circulating air and the rate of flow of air through the HVAC system.

Lin et al., US 2020/0073199 discloses a "cleansing lighting device for a cleansing application in a volume in the vicinity of the lighting device". The device includes a laser whose "dominant wavelength is the range of approximately 390 nm to approximately 15,000 nm". The device also includes a light frequency upconverter which is configured to convert the wavelength of the light "emitted by the laser light source to ultraviolet (UV) light having a dominant wavelength in the ultraviolet spectrum at or below 380 nm". The illumination source is designed to illuminate a volume that is in the vicinity of the luminaire.

Luk et al., US 2020/0309703 describes a portable device for disinfection which includes a "multi-band UV light source" that generates radiation in the UV A, B, and C regions. The device also serves to detect aerosol droplets and can be integrated into garments and personal protective equipment (PPE) such as masks and gloves.

Randers-Pehrson et al., US 2020/0353112 describes a benchtop UV irradiation chamber designed for disinfecting surgical tools and other medical implements and materials, and UV devices for the illumination of surgical sites. One disclosed surgical treatment device includes a surgery headlamp which radiates UV light supplied by a lamp through fiber optics. The disclosed devices are based on deep-UV radiation in the 207 nm to 222 nm range which is selected because it is lethal to bacteria and viruses but is unable to penetrate the nucleus of human cells. Particular emphasis is placed on the KrBr (krypton bromide) and KrCl (krypton chloride) lamps that emit predominantly in the ~207 nm and ~222 nm regions, respectively. All lamps include a low-pass filter so as to eliminate radiation having a wavelength above ~240 nm.

KR 20200110673 discloses a light diffusion method for disinfection. A light source is connected to a fiber which is positioned so as to be in proximity to a pathogen sample. The method is based on light having a wavelength in the spectral range of 380 nm to about 495 nm, which lies primarily in the visible region. Because most of the light employed is not in the ultraviolet spectral region, the exposure times often exceed 2 hours. This system is designed to disinfect medical devices, thereby deactivating pathogens responsible for hospital acquired infections (HAIs).

PCT WO2020203754 discloses a sterilization treatment device that includes a 200-230 nm lamp and a sterilization state detection method, a sensor for detecting decomposition products from bacteria irradiated by the device. The purpose of the sensor is to determine the effectiveness of the sterilization process.

Sabino et al, "Light-based technologies for management of COVID-19 pandemic crisis," Journal of Photochemistry & Photobiology, B: Biology 212 (2020) 111999 summarize various technologies that have been proposed for deactivating viral and bacterial pathogens, including germicidal UV-C light fixtures, and notes that far-UV (207-222 nm, also often known as "deep-UV") radiation appears to be safe for human exposure.

Garcia de Abajo et al., "Back to Normal: An Old Physics Route to Reduce SARS-CoV-2 Transmission in Indoor Spaces", ACS Nano https://dx.do.org/10.1021/acsnano.0c04596, propose the installation of UV-C lamps throughout commercial and public spaces such as subways and office buildings. The authors also note the potential benefit of illuminating public spaces with 222 nm deep-UV light because this wavelength appears to be harmless to human DNA and RNA. Garcia de Abajo et al. estimate the cost for installing such lamps in specific public spaces worldwide to require a "global capital investment of a few billion dollars."

It has long been known that mercury radiation at 254 nm, which is the primary emission generated by germicidal lamps, for example, produces significant damage to human DNA and RNA. Because 254 nm radiation has known mutagenic effects, however, such disinfection systems can be deployed only when humans are not present. As an example, autonomous mobile robots carrying several mercury germicidal lamps are currently distributed worldwide, primarily for the disinfection of patient rooms and surgical suites in hospitals and other medical facilities. Because of the mutagenic effects of 254 nm UV radiation on human DNA, however, such robot solutions are able only to enter unoccupied rooms or hallways but are of limited value during much of the day when people are present. Furthermore, robots must illuminate rooms and other spaces in a sequential fashion (i.e., they do not serve any space continuously), and only surfaces within the "line of sight" of the lamps borne by the robot are disinfected.

Over the past decade, medical tests at Columbia University and elsewhere have consistently indicated that UV wavelengths shorter than approximately 230 nm do not damage human DNA because this radiation is not able to penetrate skin to a sufficient depth. Instead, these energetic photons are absorbed within a few microns of the surface, thus allowing human tissue to be exposed for prolonged periods of time because human DNA/RNA is not exposed to the incoming deep-UV radiation.

As a result of the medical tests conducted to date, considerable effort has been devoted during the COVID-19 pandemic to begin installing 222 nm lamps in a wide range of public and enclosed spaces worldwide. At the present time, two companies (in the U.S. and Japan) manufacture virtually all lamps emitting at 222 nm in the far-UV region (also referred to as the deep-UV). The lamps manufactured in the U.S. are flat and thin and are being installed (or are being tested for possible installation) in restaurants, military facilities, public restrooms, universities, and various businesses. The source of the 222 nm radiation generated by these lamps is the krypton-chloride (KrCl) molecule. Although KrCl lamps radiate most of their power in the vicinity of 222 nm, weak emission extends out to ~260 nm. Although the total power radiated at wavelengths >230 nm is more than an order of magnitude below that emitted near 222 nm, even small amounts of radiation in the region between 230 and ~300 nm raises medical concerns. For this reason, manufacturers of KrCl lamps now routinely supply each lamp with an optical filter which suppresses radiation having wavelengths beyond ~230 nm. Unfortunately, the requirement for an optical filter increases considerably the cost of each lamp. Furthermore, the orientation of the filter with respect to the lamp surface can alter the transmission spectrum of the filter and, thus, adversely impact the efficacy of the filter. Another factor contributing to the cost of ownership of this technology is the lamp lifetime which is currently on the order of ~3000 hours (corresponding to several months of continuous operation). Another molecule capable of emitting in the ~200-225 nm spectral region is krypton bromide (KrBr). KrBr lamps are available currently only as prototypes and appear to be of lesser value for disinfection because 207 nm UV radiation (and shorter wavelengths) lies at the threshold for producing ozone from air. It may well become feasible to manage the small amounts of ozone produced by this lamp but, at present, operating at 222 nm allows one to avoid ozone generation completely.

Although the distribution of individual 222 nm-emitting lamps on the ceilings and walls of various public and residential rooms (auditoriums, classrooms, hallways, restrooms, etc.) will continue to be effective in disinfecting surfaces and air, distributing individual lamps throughout large buildings such as airports, retail stores, and hospitals has several drawbacks. One disadvantage is the cost-of-ownership (including maintenance) associated with the large number of lamps required. For example, the cost of installing and servicing lamps installed throughout even a small hospital would be prohibitive. Although the lifetime of single 222 nm lamps is expected to rise, the service lifetime of deep-UV lamps will likely require replacement at least once per year. Other drawbacks of existing 222 nm lamps include the emission of longer wavelength radiation which requires the use of an optical filter, and the expense associated with electronic control of the lamps individually.

SUMMARY OF THE INVENTION

A preferred embodiment provides light generation and light distribution method. The method includes generating laser light with a semiconductor laser or an array of semiconductor lasers at a generation location. Light generated by the semiconductor laser is guided to a frequency converter. Light converted by the frequency converter is directed to a plurality of distribution locations.

In a local example, the generation location can be a wall or ceiling location the distribution locations are local locations, such as a single space/room or a cluster of adjacent spaces/rooms.

In a centralized example, applicable for larger and distributed distribution locations, the generation location is a central location and the light generated by the frequency convertor is guided to distribution locations which are one or more of a plurality of remote locations. Frequency of emission(s) from the semiconductor laser(s) are converted with one or more optical components to one or more wavelengths for disinfection, medical therapy, background or general lighting, or photochemical processes, wherein the frequency conversion is conducted at the central location before the guiding to remote locations, or near one or more of the plurality of remote locations after the guiding. A portion of the light is selectively extracted at one or more of the plurality of remote locations. The portion of light is distributed in one or more directions via an optical distribution network so as to provide for one or more of disinfection, medical therapy, lighting, or photochemical processes.

A light generation and light distribution system includes a semiconductor laser or array of lasers at a generation location. A frequency-conversion optical component modifies the wavelength of the radiation generated by the semiconductor laser to one or more desired wavelengths for disinfection, medical therapy, photochemical processes, and/or lighting. Light extraction and distribution optical components extract from the distribution system a portion of the light in the system so as to provide for one or more of disinfection, medical therapies, general or background lighting, and photochemical processes. The frequency-conversion optical component can be at a central generation location that is remote from the light extraction optical components. The conversion optical components can only be at the light extraction locations, wherein the generation location is central and the distribution locations are remote. In another implementation, the distribution locations are local to the generation location and the extraction optical components comprise a hemispherical optical element.

BRIEF DESCRIPTION OF THE DRAWINGS

FIGS. 3A-3F are schematic diagrams of preferred configurations for the terminus fixture of the FIG. 2A light distribution system;

DETAILED DESCRIPTION OF THE PREFERRED EMBODIMENTS

Figure 1:
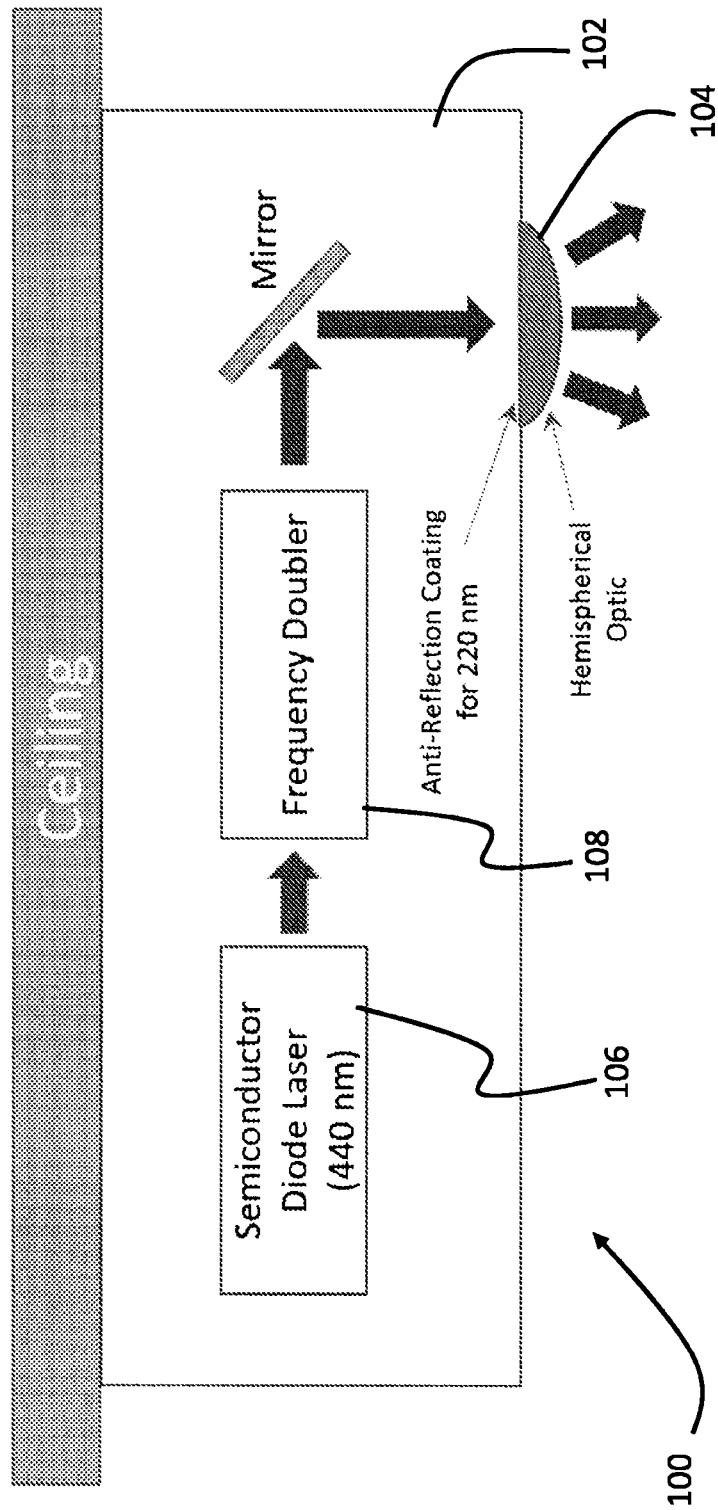
FIG. 1 is a schematic diagram of a preferred embodiment light distribution system applicable to the distribution of light locally to the site of the deep-UV light generation system.

In the present application, the word "light" is used interchangeably with "radiation" or "optical radiation". Furthermore, the word "light" in the field of optics and lasers is often reserved for visible light but here the term is intended to encompass non-visible radiation and, specifically, the ultraviolet (UV) and vacuum ultraviolet (VUV) spectral regions as well.

Preferred multiwavelength light distribution methods are based on a system including: a central UV generation unit that generates deep-UV radiation and includes at least one laser and one frequency conversion element or device that may be a nonlinear optical crystal, fiber, or other nonlinear optical component, a UV fiber or polymer capillary distribution network, and one or more light distribution fixtures affixed to the fiber/capillary at each terminus of the network. A polymer capillary or microtube is, a polymer cylinder having a diameter typically below 500 um and a hollow, cylindrical core that can be filled with an inert, dry gas such as nitrogen. The wall of the hollow core can be coated with a metal film or other reflective material so as to promote the efficient propagation of deep-UV light through the capillary/microtube. Thus, UV grade fiber and polymer capillaries/microtubes are examples of optical waveguides currently available to artisans for transporting deep-UV radiation over distances of hundreds of meters or km. However, optical waveguides need not be cylindrical but can also be planar, such as fused silica waveguides fabricated onto a planar substrate.

Together, the laser and the frequency conversion element or device preferably provide the second or third harmonic of a high-power semiconductor laser or an array of semiconductor lasers. However, the required UV radiation may be provided by another laser designed to emit in the ~200-230 nm region. Additionally, the laser may be a non-semiconductor laser, such as an upconversion fiber laser, that emits in the UV when pumped in the visible, or a lamp. The UV generator system may also produce visible light, such as blue/violet light (~400-470 nm), intended for therapeutic applications in hospitals or clinics, or for producing white light in selected locations by conversion of the blue light by a phosphor. Preferred methods also include UV optical fiber designed specifically to efficiently transmit 200-230 nm radiation with minimal loss. Serving to distribute the UV light produced by the UV generator system, the fiber network is instrumental in delivering UV radiation in the proper proportions to various rooms in any building or public or residential space. Specifically, generator system light is launched into a trunk/main light guide, e.g., a single optical fiber, a bundle of fibers or one or more capillaries/microtubes, and transported from a central location housing the system (such as a utility room) to another position in a commercial building, cruise ship, or any other space requiring deep-UV disinfection. Another example is situating a UV generator system in the bay of a commercial aircraft and conveying UV light to multiple locations in the pressurized passenger cabin and cockpit of an aircraft with deep-UV optical fiber. Once the UV radiation reaches the desired location, UV extraction and distribution fixtures are affixed (or are located in proximity) to each terminus of the UV fiber distribution network for the purpose of distributing UV or visible light within a room or an enclosure such as a medical "light box". Various optical structures (such as planar or circular waveguides, capillaries, optical gratings, prisms, etc.) can be installed in the UV fiber distribution network to serve to extract a fraction of the light traveling along the trunk through an optical "port". The optical element extracting UV or visible radiation from the trunk line can be wavelength selective (such as an optical grating designed to extract UV or is capable of extracting both UV or visible light simultaneously through higher-order diffraction, for example). One or more distribution fixtures then direct the extracted wavelength(s) throughout a room or space (such as a hallway) or a specific portion of a room or other space for one or more purposes, including disinfection, lighting, and medical therapeutics. In addition, the light extracted from a fiber port may be directed to an enclosed space in a larger room such as a "light box" devoted to phototherapy for infant jaundice, for example, or the dermatological condition known as Bowman's carcinoma.

One embodiment of the invention is a compact local distribution system system including a semiconductor laser, or array of lasers, generating blue/violet light (400-460 nm), that is frequency-doubled to the 200-230 nm wavelength region. Such a system can be ceiling or wall-mounted and a hemispherical optic, or other light distribution optic, can be installed following the frequency generator so as to distribute the deep-UV radiation locally, e.g., throughout a large room or a cluster of adjacent spaces, for example. Distributing deep-UV light remotely throughout a multi-room facility in which large numbers of rooms separated from each other, however, requires use of a fiber/capillary/microtube distribution network as described below.

Preferred embodiment methods and systems overcome limitations of existing KrCl (nominally, 222 nm) lamps, and particularly in those applications requiring coverage of large areas. For a hospital, cruise ship, schools, or large commercial buildings, for example, literally hundreds of individual lamps may be required, as discussed in the background. The present invention provides a scalable technology for which cost is reduced because the UV and/or visible light generator need not be distributed throughout the space or building of interest. Rather, the generator can be localized and the optical fiber (or capillary) system transporting the radiation through a building may be "tapped" wherever desired. Making modifications to the distribution system is inexpensive because only the splicing of fiber into the fiber trunk, or installing a new fiber line (as higher quality UV fiber becomes available), is required. Furthermore, the preferred method for generating deep-UV radiation—nonlinear wavelength-conversion of high-power semiconductor lasers—leverages the extraordinary lifetimes and steadily falling costs of semiconductor lasers, or arrays of semiconductor lasers, to serve as a primary and central (localized) light generator for a system implementation in a particular building, section of a building, auditorium, ship, public gathering area, aircraft, etc. If a public space is particularly large, and transmitting UV or visible light over exceptionally large distances is impractical because of losses in the UV fiber/mictrotube distribution network or practical limits on the power of the UV generator, other embodiments allow for two or more localized generators to be installed at opposite ends of a building or at selected locations in a building or other public space. This approach will reduce the cost of each individual generator and, thus, the entire system.

Preferred methods and systems use a laser or array of lasers based upon the III-V semiconductors: gallium nitride (GaN), indium gallium nitride (InGaN), or aluminum indium gallium nitride (AlInGaN). These commercially-available lasers provide continuous powers of more than several Watts, are cost-effective, and offer various emission wavelengths in the blue and violet regions of the visible spectrum. Frequency-doubling an InGaN laser operating at ~440 nm in the blue, for example, produces radiation at ~220 nm, which is close to the peak emission wavelength of the KrCl lamp. One advantage of such a frequency-doubled laser is that no spurious UV emission that might be harmful to humans is generated. That is, the spectrum of the semiconductor laser itself, and the frequency-doubling process, ensure that the spectrum of the UV radiation generated by frequency-doubling or tripling of a visible laser does not extend past 225 nm or 230 nm, at which point UV radiation can become of medical concern. That is, the wavelength of the UV light generated and distributed by preferred embodiments and systems is under the control of the artisan and is not dictated by the spectrum emitted by a molecule, for example. Although frequency-doubling has thus far been reported for only a few high-power laser diodes and is quite inefficient, efficiencies for this process are expected to improve over time to 40% or more, thus making a minimum of several Watts of UV radiation available for distribution throughout a building or other public space. Semiconductor lasers provide projected lifetimes which are in excess of 20,000 hours, or almost an order of magnitude larger than that for KrCl 222 nm lamps at present. This makes installation and maintenance cost-effective, especially when a single light generator can provide the light required at multiple remote locations, such as various rooms in a building or hospital. For the largest facilities or public spaces, UV/Visible light generation can be de-centralized with multiple light generators at strategic locations, and having separate fiber/capillary distribution networks to deliver light to different sections of a building or a complex of buildings. The UV/visible power produced by each generator need not be the same but rather determined by the power requirements for the room volumes or surface areas to be disinfected or otherwise "covered". Furthermore, the wavelengths generated by each of the generator systems need not be the same but rather specifically tailored to meet a particular disinfection or other medical application. It is likely that different pathogens will be shown to respond most effectively to a specific range in deep-UV wavelengths. The preferred embodiments allow for the deep-UV wavelength(s) generated by the system to be optimized for deactivating specific pathogens. Furthermore, each application can be matched with currently available, commercial diode lasers and laser arrays.

An important aspect of preferred embodiments and systems is that they conform to international standards regarding the exposure of humans to sub-230 nm wavelength radiation. The International Commission on Non-Ionizing Radiation Protection (ICNIRP) has long determined the exposure limits of humans to radiation of different wavelengths. Although the current exposure limits for wavelengths of 200-230 nm are expected to rise substantially in the near-future because of recent biomedical studies showing 222 nm light to be safe for humans, all of the embodiments of generators and distribution systems are controlled (through the current delivered to the semiconductor lasers or with attenuation (interference) filters situated within the fiber/microtube distribution network or at the network extraction points (terminals) such that every position within a room or other space illuminated by deep-UV radiation conforms to the regulations of the ICNIRP and other regulatory bodies.

Preferred methods and systems can also use longer-wavelength UV and/or visible light for medical phototherapy treatments. Examples include the 300-315 nm region of the ultraviolet spectrum that is widely used for the treatment of psoriasis. Another is the 270-300 nm wavelength region for general disinfection, presuming humans are not present. Light having these and other wavelengths can be introduced into the distribution system at the source, and routed through the system by the same optical devices (beam splitters, gratings, circulators, etc.) that are designed for the distribution of 200-230 nm radiation for deactivating pathogens. The source for the 300-315 nm region can be a frequency-doubled red or orange semiconductor laser or an array of lasers. The source for shorter wavelengths (such as 270-275 nm) can be a frequency-doubled Ho: ZBLAN fiber laser, where Ho represents the holmium atom and ZBLAN is an acronym for a type of glass fiber comprising the fluorides of zirconium, barium, lanthanum, aluminum, and sodium (Na), The output power required of an optical generator is dependent upon the application and the room volumes and surface area at hand. In the case of disinfection, for example, every pathogen such as COVID-19 or MRSA has a different response to UV radiation of a given wavelength. In other words, the degree of lethality of a particular wavelength of UV radiation differs for each pathogen. For this reason, medical researchers, engineers, and physicists worldwide have measured (or are presently measuring) the energy fluence of UV radiation, expressed in milli-Joules per square centimeter ($mJ/cm^2$), necessary to reduce the number of a given pathogen in a particular area by a specific amount. As one example, the cumulative exposure of 254 nm (mercury) radiation necessary to decrease the number of pathogens in 1 $cm^2$ of area by 99.9% (known as a log-3 reduction) has been measured for a number of viruses and bacteria. For the KrCl lamp wavelength of 222 nm, less data is presently available but early results indicate that a log-3 reduction in the COVID-19 virus requires an energy fluence of several $mJ/cm^2$. From such data, one can calculate the laser power necessary to irradiate a given surface area over a specific period of time so as to yield the required log-3 reduction. Similar comments could be made for log-5 or log-6 reductions in the pathogen count, for example. Thus, the two important parameters for a deep-UV disinfection system are the irradiation wavelength and the cumulative energy exposure. If, for example, the energy exposure required for a log-3 reduction of a particular pathogen is 5 $mJ/cm^2$, this exposure can be achieved by illuminating the area of interest with an intensity of 1 $mW/cm^2$ for 5 seconds, or an intensity of 10 $uW/cm^2$ (micro-Watts/$cm^2$) for 500 seconds. Consequently, a trade-off exists between the UV laser (i.e., frequency-doubled or tripled laser radiation) intensity at a surface (or in room air), the laser wavelength, and the time over which the area of interest must be exposed. In short, the cumulative energy exposure of a virus, for example, to incoming deep-UV light (expressed in mJ/cm$^2$), and not instantaneous power, is the parameter determining the rate at which the pathogen is destroyed. It should again be mentioned that an artisan will ensure that all radiation exposure regulations are followed strictly.

For the central generator of preferred systems, one or more diode lasers are frequency-doubled or tripled so as to efficiently generate radiation in a desired portion of the far-UV spectrum. Alternatively, the radiation from two diode lasers, operating at two separate wavelengths, can also be summed by nonlinear optical techniques known to one of skill in the field of lasers and optics. Frequency-doubling can be accomplished with discrete nonlinear crystals such as Beta Barium Borate (BBO) or other materials, but also by launching power from the diode lasers into a section of nonlinear optical fiber. Since the process of frequency-conversion has an efficiency of <100%, a fraction of the power at the fundamental wavelength (i.e., the original wavelength of the laser itself) is also available for distribution in a building, manufacturing facility, or other space.

Because the UV power supplied by a preferred distribution system is sufficient for the disinfection of air and surfaces in rooms having tens of thousands of square feet of floor space to beyond 100,000 ft$^2$, the distribution of UV light within the room may, in most situations, be conveniently accomplished by devices situated at a single, central termination point. That is, the fiber or other optical waveguide material (such as Al-coated polymer microtube or silica capillary (hollow core)) can be terminated at a particular position in this room and the light distributed by one or more distribution devices. These include spinning conical, planar, or ellipsoidal surface mirrors and Bragg gratings. The latter can be employed to choose a specific wavelength, or range of wavelengths, for dispersal into the room. Bragg gratings can also be designed to launch light of the desired wavelength in a particular direction. They may also be used to launch the light into a plane that is perpendicular to the axis of the fiber or other waveguide carrying the incoming UV light. Alternatively, the laser/frequency doubling unit can itself be installed on the ceiling of a large room, and its deep-UV light distributed within the room with a hemispherical optic or other optical component.

Preferred embodiments of the invention will now be discussed with respect to experiments and drawings. Broader aspects of the invention will be understood by artisans in view of the general knowledge in the art and the description of the experiments that follows.

FIG. 1 illustrates an embodiment of a ceiling-mounted local light distribution system 100 intended to provide illumination of a single room or a small cluster of adjacent rooms with 220 nm radiation, as an example. A wall mount is also an option. In addition, while shown as an external mount in a housing 102, mounting of components other than a distribution optical element 104 can be internal to a wall or ceiling or other spatial boundary structure. Light generated at 440 nm (blue light) by a semiconductor diode laser 106, or an array of lasers, is generated at a generation location which can be on a ceiling (as shown in FIG. 1) and is delivered to a frequency-doubling unit 108 by either free-space transmission or an optical waveguide such as a fiber or a polymer capillary having the appropriate internal coating (Al, dielectric coating, etc. as described earlier). After the 440 nm fundamental is frequency-doubled to 220 nm, the UV radiation is directed, along with residual (non-frequency doubled blue) light, into the room with a mirror 110 and the distribution optical element, e.g., a hemispherical optic or other optic known in the art. UV light impinging on the upper surface (flat and anti-reflection (AR) coated) of the optic will be dispersed throughout the room, depending on the point on the lower (curved) surface at which a light ray leaves the optic. A wide range of static and electromechanical optical components and systems can also be used to efficiently disperse the light within a room. An interference filter can also be used to remove the blue light if its dispersal in the room is undesired.

Figure 2A:
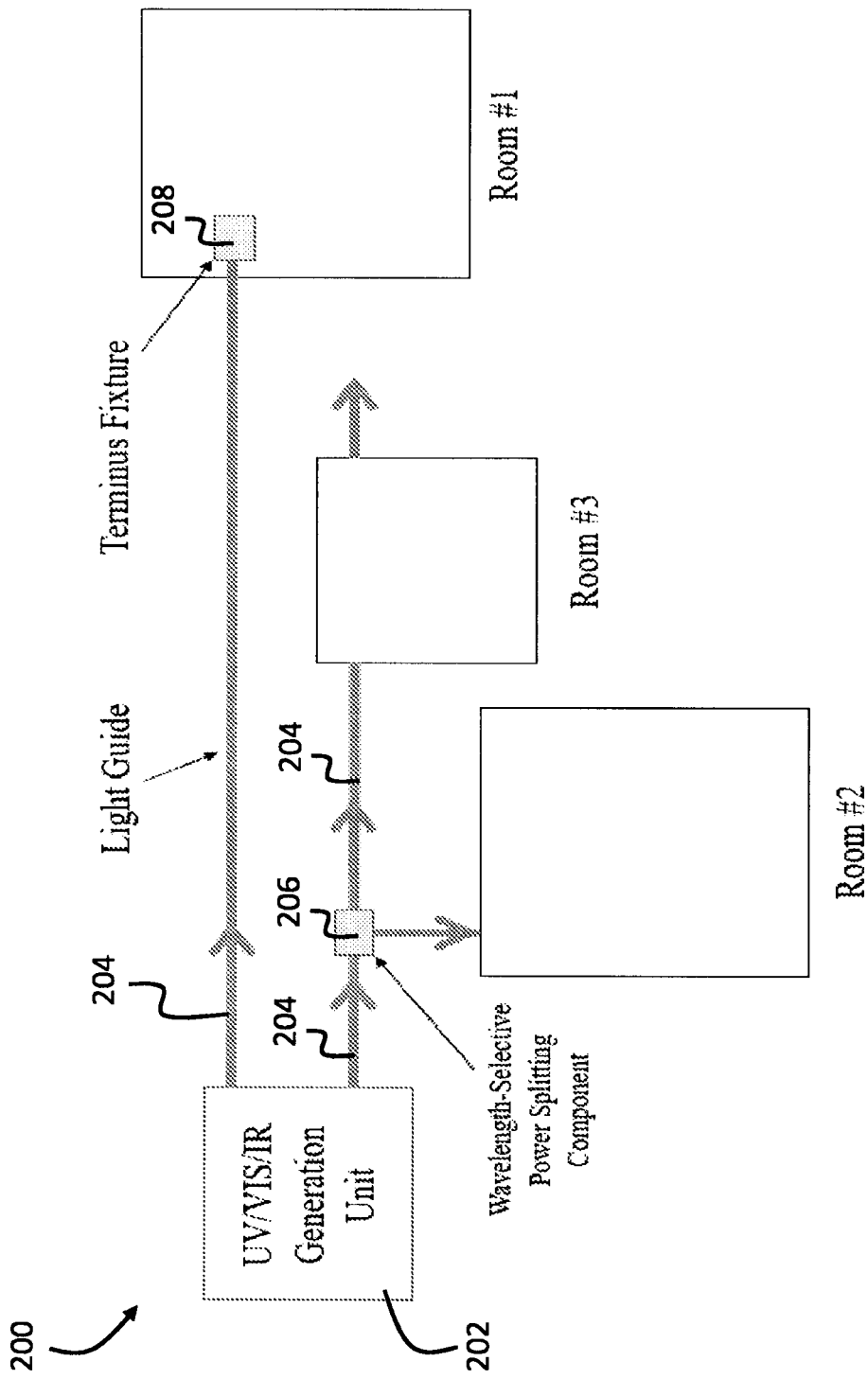
FIG. 2A is a schematic diagram of a preferred embodiment light distribution system for remote distribution.

FIG. 2A shows a preferred embodiment light distribution system 200. A light generation unit 202 generates one or more wavelengths of light to be distributed. The generation unit 202 can generate, for example, UV, visible and/or IR wavelengths. In an example embodiment, light in all three bands is generated by a combination of at least one laser and one or more nonlinear optical components. The radiation is launched into one or more light guides 204, e.g. optical fibers or polymer capillaries/microtubes, for transport through a building or space in which the system 200 is applied. The optical waveguides ("light guides") 204 are selected according to the destination, e.g., Room #1, Room #2 or Room #3 in the FIG. 2A example. The light guide design chosen will also depend on the current cost and the transmission of a specific length of light guide. For example, the current transmission available with even UV fiber of the highest quality is currently not suitable for transporting light over distances beyond 100 m (because of unacceptably large losses at present) and, consequently, early systems will likely be dependent on polymer capillaries (with metallic or dielectric coatings on the interior surface) to transport deep-UV light over considerable distances. Nevertheless, optical fiber will undoubtedly improve markedly in the next several years with respect to transmission and scattering properties and are likely to become the transmission medium of choice. Rooms can be non-building locations, such as in a plane cabin. For transmission of UV wavelengths, several types of UV-transmissive fiber exist at present and one would normally choose the fiber offering the lowest attenuation per unit length that is available so as to minimize power losses in the distribution system. A primary fiber "trunk line" 204 leaving the laser/nonlinear (frequency-conversion) optical source(s) may include one or more fibers, depending on the physical layout of the rooms and other spaces to be irradiated. In particular, it may be desirable to launch the deep-UV and/or visible light generated by the central source into a fiber bundle. In that way, the UV radiation (for example) captured by each fiber could be routed to a particular room in a building. If more power is required for a particular room or space, the power carried by two or more fibers could be routed to the same room or space. In this way, engineers have enormous flexibility in designing UV disinfection systems in different buildings and public spaces.

Alternatively, the UV/optical distribution network need not be realized with fibers. For example, the light guide(s) 204 may be silica, glass, or polymer capillaries that can be coated on its interior surface with a UV-reflective film (such as aluminum or a dielectric material). Furthermore, this line, or multiple lines, may (for cost and convenience) can be installed either within or near the electrical conduit that supplies power to the building, ship, aircraft, etc. When a space to be irradiated is reached by a trunk line, power may be extracted or "branched" by one of a variety of methods, including splicing or Y-splitting with a wavelength selective power splitter 206, as shown in FIG. 1A for Rooms #2 and #3.

As an example, splicing fiber into a trunk line can provide branches that deliver a desired fraction of the total UV power to a particular room/location. Other approaches to extracting power in a precise manner from a trunk line include Bragg gratings that are wavelength-selective. In this way, one is able to selectively extract either blue or UV radiation (for example) from a fiber or fiber bundle in which radiation of both wavelengths has been propagating in the optical distribution network. Other optical components for selectively removing a precise percentage of the power propagating in a fiber are known to artisans. If the approach mentioned above of employing separate UV fibers to carry power to different locations is employed, then tapping a trunk line is not necessary. At a delivery point, a fixture 208 can distribute and direct light, such as shown in Room #3 in FIG. 1A.

Figure 2B:
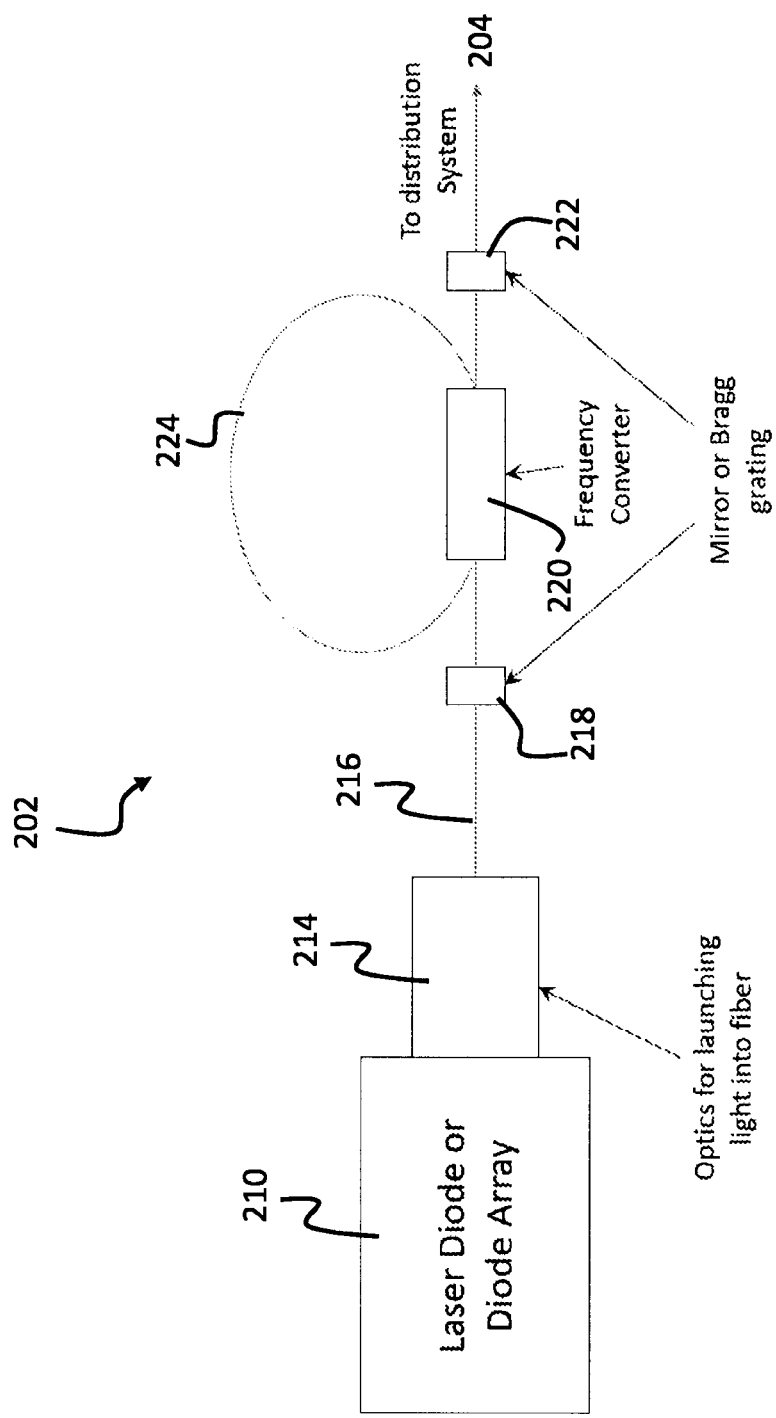
FIG. 2B is a schematic diagram that shows a preferred generation unit for the FIG. 2A light distribution system.

FIG. 2B shows a preferred generation unit (generator) 202, configured for deep-UV generation. The unit 202 includes a source 210 of visible light in the form of a semiconductor laser or an array of semiconductor lasers. With current technology, the beam quality of semiconductor lasers is not suitable for efficient conversion of such visible laser light to shorter wavelengths. The generator, therefore, includes launching optics 214 that reshape the laser output so as to be able to efficiently launch the visible light into a fiber, other optical guide 216, or directly into the frequency-conversion unit 120. Subsequently, this visible light propagates through the fiber 216 and reaches a mirror 218 having a high degree of transmission at the wavelength of the arriving light but high reflectivity (typically above 99%) at the desired deep-UV wavelength—the second or third harmonic of the visible or near-infrared light produced by the semiconductor laser(s). The visible light then enters a frequency-convertor 120, which may consist of one or more crystals suitable for doubling or tripling the frequency of the arriving light. The generation unit may also include a line narrowing optic, such as a volume Bragg grating (VBG), so as to reduce the spectral breadth (linewidth) of the laser(s) and thereby improve the conversion efficiency for the frequency-doubling process. Also, a frequency-selective element in the converter 220 separates the visible (fundamental) light from the second or third-harmonic light and directs the "upconverted" (UV) light through a mirror or grating 222 into the light guide 204 of the light distribution system. Meanwhile, visible light that is not converted into UV is recirculated by a fiber loop 224 to the input of the frequency convertor 220 for a second "pass" through the convertor 220. In this way, the conversion efficiency will be maximized.

FIGS. 3A-3F show some preferred options for the terminus fixture 208 of the FIG. 2A light distribution system. FIG. 3A shows a simple approach of allowing an end 202 of an optical fiber to simply "spray" the light. The angle of the optical beam emerging from the fiber end 302 (unterminated with any other optical device) is given by the numerical aperture (NA) of the fiber or the aperture of the capillary. FIG. 3B shows addition of a diffuser material 304 to the end 302 of the fiber. This can provide greater distribution of radiation than the unterminated fiber in FIG. 2A. FIG. 3C shows that spinning/rotating mirrors or diffusers 306 can be used as an active optical distribution element. The mirror 306 can be angled and shaped to provide a range of distribution depending upon its orientation. The orientation can be computer controlled, and can be implemented in preferred embodiments with a remote interface, such as through Wi-Fi and or a dedicated control panel, so as to have remote control over: 1) the area in a room being illuminated at any given time, 2) the diurnal cycle of the illumination, and 3) the total exposure per hour of the surfaces and air in a given room. However, simpler light distribution optics, such as the hemispherical optic of FIG. 1 may also be used.

FIG. 3D shows microlens 308 (plano-convex, GRIN, etc.) on the end 302 of the fiber (or capillary). This can be accomplished, with the diffusive material 304, for example, with an optical adhesive. The microlens 308 provides an inexpensive solution for narrowing the solid angle of the light emerging from the fiber or, alternatively, spraying the light over the entire room and its walls, if desired. Because the wavelengths of deep-UV light of greatest interest (~200-230 nm) are known to be safe for human exposure and the dosage per unit area is minimized, then the optical components at the terminal points of the distribution network can be designed to either broadly illuminate an entire space or only a specific portion of a room or auditorium, for example. An additional option shown in FIG. 3D, for example, is a fiber/guide 310 that receives focused light from the microlens 208 for transporting the incoming light to a specific place within the location (business area, room, hallway, etc.) receiving the light distribution. For example, such a fiber or fiber bundle 310 may be desirable for transporting deep-UV radiation in a surgical suite to the surgeons and nursing staff for disinfecting a surgical site during surgery so as to address one type of Hospital Acquired Infections (HAIs). Another example is the transport of UV radiation to disinfection stations including an enclosure in which surgical tools and other medical instruments are disinfected. This fiber "line" might be one of several that make deep-UV radiation, an effective but also safe disinfectant, available to surgeons, clinicians, and nurses for mitigating infections. A fiber line might carry blue light to infant jaundice "light boxes." In an Infant Care Unit (or "NICU": Neo-Natal Intensive Care Unit) in a hospital, for example, wall or ceiling fixtures can provide feedthrough fittings that would allow additional lengths of fiber or capillary to transport blue light to separate "light boxes" for the treatment of infant jaundice. Similarly, red light from red-emitting (~620-660 nm) semiconductor lasers can be generated and made available to dermatology units in hospitals or clinics for the treatment of various skin disorders such as common acne or Bowman's carcinoma. Frequency-doubling the radiation from a red laser emitting at ~616-620 nm, for example, would also provide the ~308-310 nm radiation that is commonly employed for phototherapeutic treatment of psoriasis. Currently, only a few select medical centers in the U.S., such as the Wellman Laboratory at Massachusetts General Hospital in Boston, offer this treatment which presently requires large and expensive XeCl (xenon chloride) excimer lasers (308 nm).

FIG. 3E shows another optical reflector, which can be a rough/scattering surface 312, which provides diffuse/random distribution at a site. FIG. 3F shows an optical termination that is a combination of convex 314 and concave 316 reflectors, which can be coated to reflect a specific wavelength range. The concave reflector 316 is shown to be spherical but this optic may also be elliptical or an off-axis paraboloidal reflector, depending on the light distribution pattern desired. An example is a uniform distributed circular pattern as shown in FIG. 3F.

The lens and other optical elements of FIGS. 3A-3F can also be formed of electrochromic materials that offer variable transmission in response to an imposed voltage. This, too, can offer computer control of radiation wavelength that enters any given location. As one example, UV and visible light can be distributed with the system 200 throughout a building via conduits/routings along which electrical power and water are currently being distributed. The distribution can include a range of wavelengths, and computer control can select wavelengths to apply at each location. As an example, different wavelengths of deep-UV radiation can be selected and delivered to specific locations in commercial buildings, hospitals, schools, and other public spaces. Another advantage of such a system of the invention (relative to discrete sources such as lamps) is the ease with which the UV light intensity and wavelength in any building or other public space can be controlled. If, for example, the optimal solution for the disinfection of public spaces in the future proves to be the provision of a low-intensity background of radiation anywhere in the ~200-225 nm spectral region, it is straightforward to provide such a uniform deep-UV light background with the embodiments presented here, and to do so at wavelengths in this wavelength range that are not currently available with lamps.

Any or all of the solutions in FIG. 3A-3F can be configured as a light fixture and attractively packaged. Such a fixture can be mounted on the ceiling or wall of the room at each remote location, for example. The fixture can include any of a number of passive optical elements such as diffusive optical materials, reflective elements such as concave or convex reflectors, or transmissive optics such as that of FIG. 1.

Figure 4:
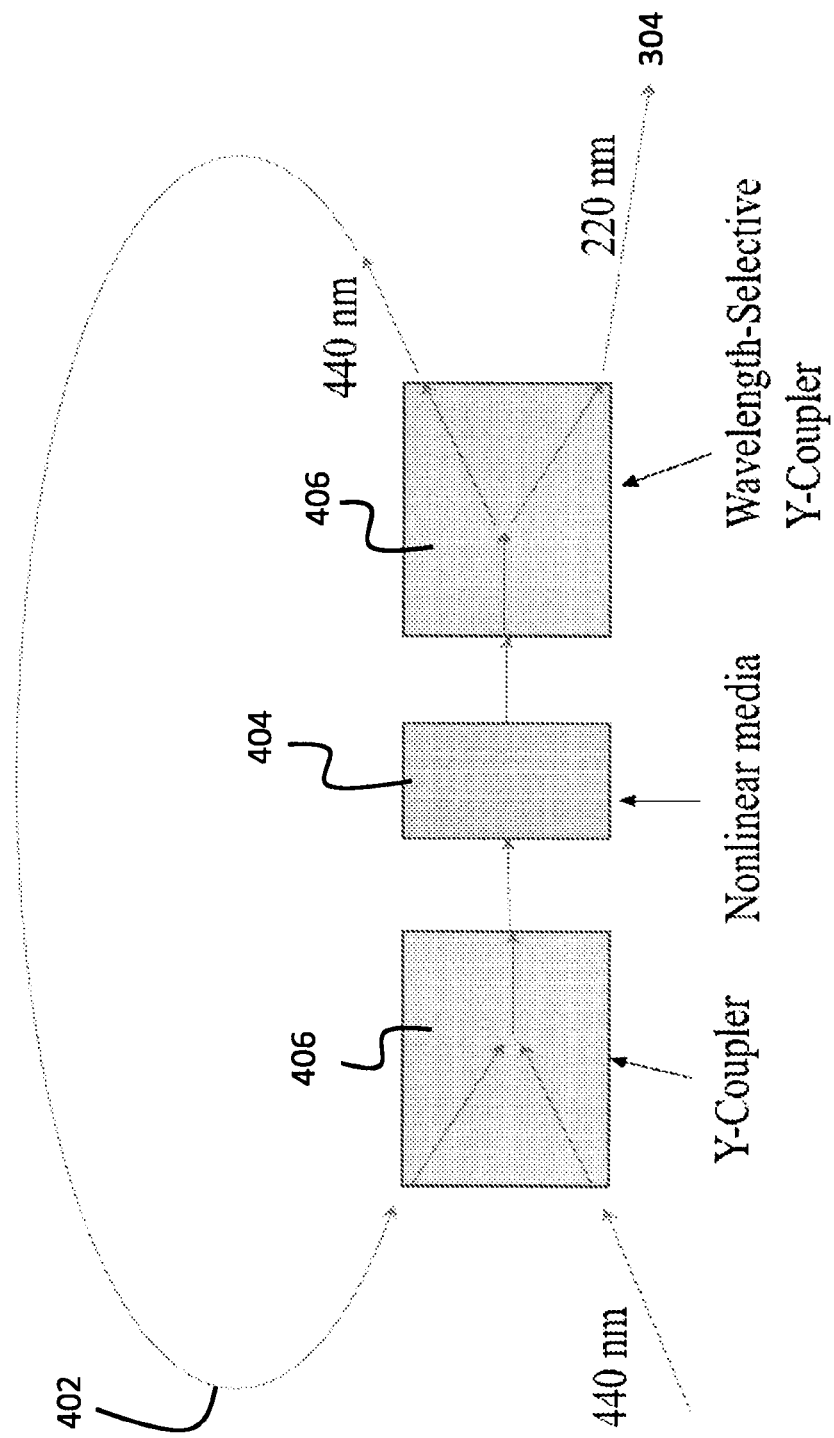
FIG. 4 illustrates a frequency (i.e., wavelength) converter that can be used in the light generation unit of FIG. 2A to double the frequency of a visible semiconductor laser with recirculation of first-pass unconverted light.

FIG. 4 illustrates a converter that can be used in the light generation unit of FIG. 2A and provides an alternative to doubling the frequency of a visible semiconductor laser in a single-pass arrangement. A fiber or capillary 402 provides a transmission medium that recirculates a portion of the fundamental (visible) not converted into UV in a first pass through a nonlinear optical element 304 (such as a BBO crystal). Y-couplers 406 receive input light from a laser, direct light into and out of the nonlinear optical element 404 and into the fiber 402, and provide output light. FIG. 4 is labelled to indicate the conversion of blue, 440 nm light into 220 nm radiation in the deep-UV. Specifically, incoming 440 nm light from a laser generator (generally, a semiconductor laser or array) enters the first Y-coupler 306 and is then delivered to the nonlinear medium 404 (a crystal) by which the 440 nm blue light is frequency-doubled into 220 nm (deep-UV) radiation. After exiting the nonlinear medium 404, the unused 440 nm light and the 220 nm emission are separated by a second Y-coupler 406. The 222 nm emission leaves this wavelength conversion system and enters the fiber or capillary 204 of the distribution network 200. 440 nm light, on the other hand, is circulated back in the fiber 402, to the front (input) of the wavelength converter to combine with incoming 440 nm light, thereby increasing the efficiency of the frequency-doubling (wavelength conversion) process.

Figure 5A:
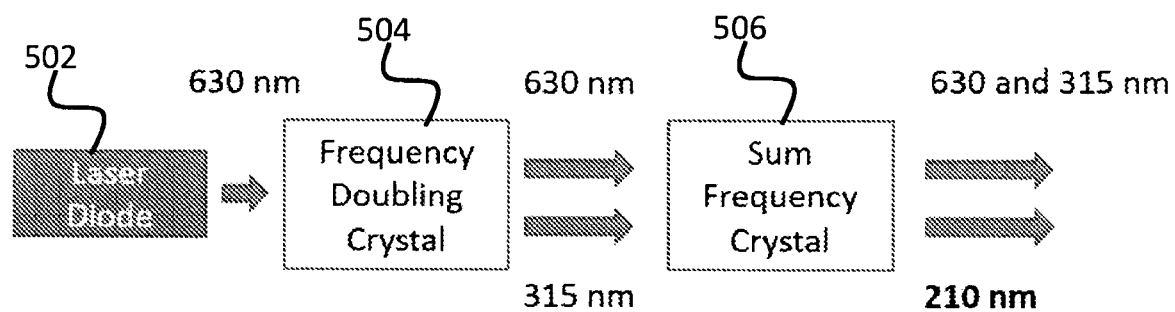
FIGS. 5A-5E illustrate wavelength conversion arrangements by which wavelengths in the deep-UV and visible regions can be generated from a laser diode in the generation unit of FIG. 2A or at other locations in the system of FIG. 2A.
Figure 5B:
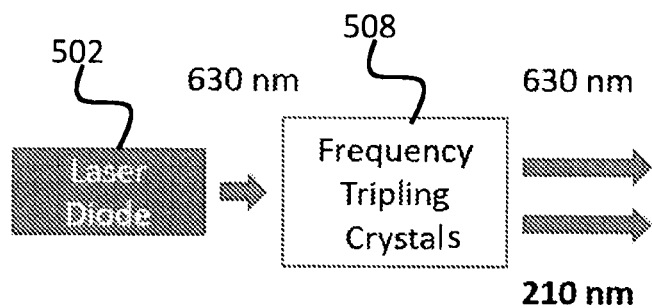
Figure 5C:
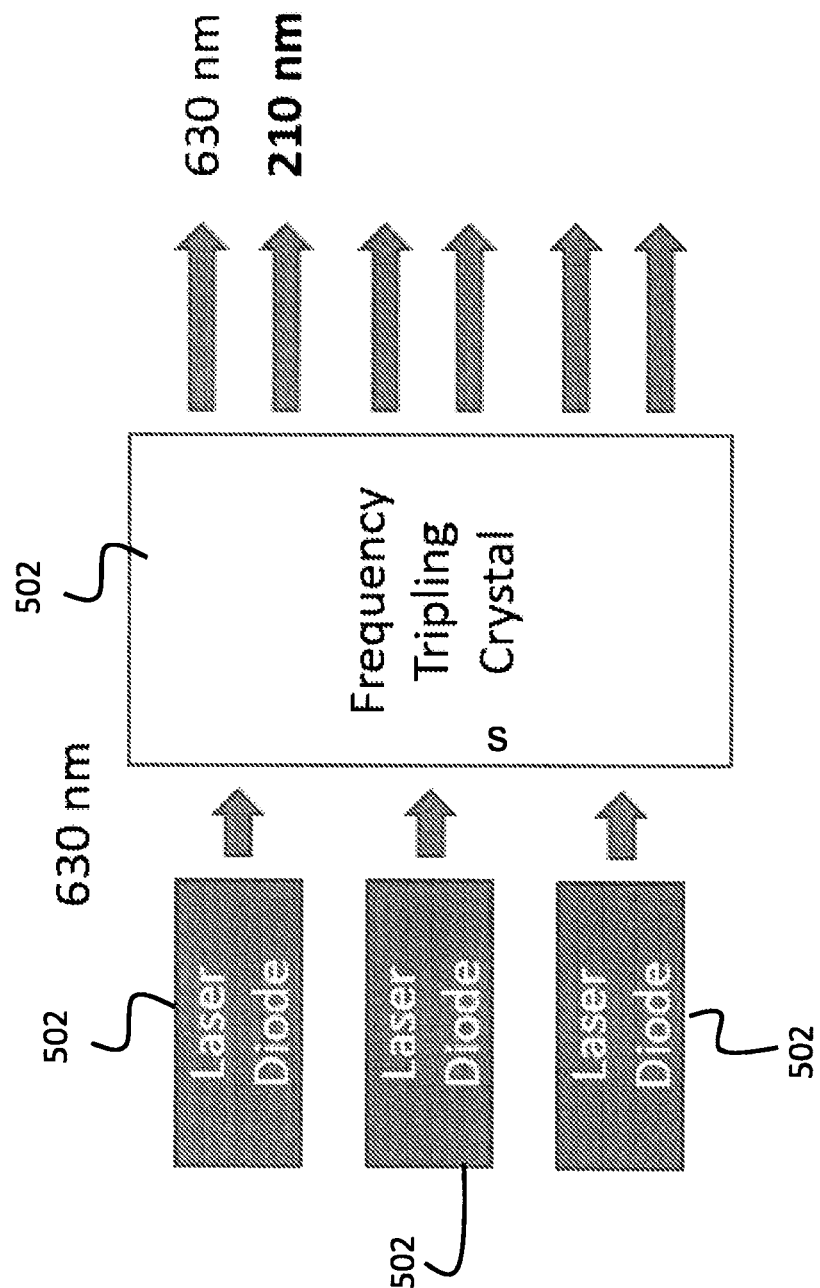

FIGS. 5A-5E illustrates various other wavelength conversion arrangements by which wavelengths in the deep-UV and visible regions can be generated from a laser diode 402 in the generation unit 202. FIG. 5A illustrates the two-step frequency-tripling of a 630 nm (red) laser or array of lasers. The first step is to frequency-double the 630 nm light in a doubling crystal 504 which generates 315 nm UV light. The second step involves summing the 315 nm radiation with 630 nm light not used in the frequency-doubling process with a summing crystal 506. This two-step process yields 210 nm deep-UV radiation, which is well-suited for disinfection. FIG. 5B illustrates the same tripling process via a tripling crystal 508, which performs the same two sub-processes of frequency-doubling and sum-frequency generation (SFG). FIG. 5C uses the tripling crystal that performs the frequency-tripling of 630 nm to 210 nm, while additional laser diodes 502 emitting at wavelengths other than 630 nm (such as 620 nm, 640 nm, etc.) are used to produce a variety of UV wavelengths. This broad approach to the generation of deep-UV light from semiconductor lasers can be useful because the optimal wavelength for the deactivation of pathogens is expected to differ from one pathogen to another. With the generation system of FIG. 5C, system 200 is able to address different known pathogens and new pathogens that might arise in the future. A variety of different wavelength semiconductor lasers or arrays of semiconductor lasers emitting at specific peak wavelengths throughout the blue/violet and red regions of the visible spectrum are currently available commercially, and those not currently available can, generally speaking, be produced by the manufacturer through adjusting the composition of the InGaN ternary alloy, for example. Such lasers and laser arrays can provide one or more of the laser diodes 502 shown in FIG. 5C, or in any other of the generation units in the present disclosure. As one example, laser wavelengths of ~400-450 nm are currently available widely in commercial products in the blue/violet region and, therefore, deep-UV light in the ~200-225 nm region is readily attainable by frequency-doubling.

Figure 5D:
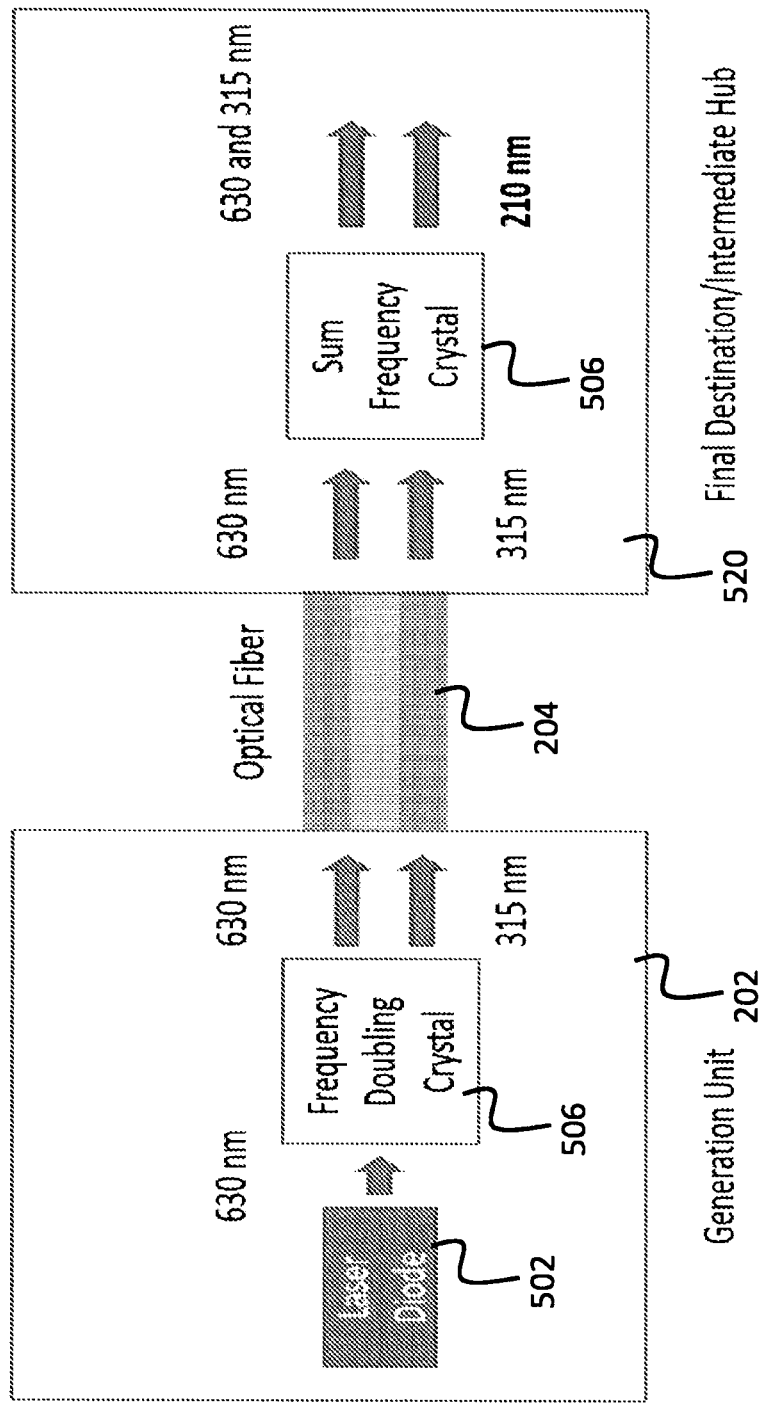

FIG. 5D divides the process of frequency tripling into two steps for use in the generation unit 202 and a destination (termination) hub 510 at or near a remote destination location, e.g. Room #1 after transmission through the fiber/trunk 204, which can be useful because the transmission of existing commercial UV fiber declines in the 200-230 nm region but remains high above 300 nm, for example. For this reason, it is advantageous (at present, until higher quality deep-UV fiber is available) to delay the final wavelength conversion step until the distribution system nears the point of use by adding the destination conversion hub 510. It is at this point that FIG. 5D shows the generation of 210 nm radiation from sum-frequency mixing of 315 nm and 630 nm light.

Figure 5E:
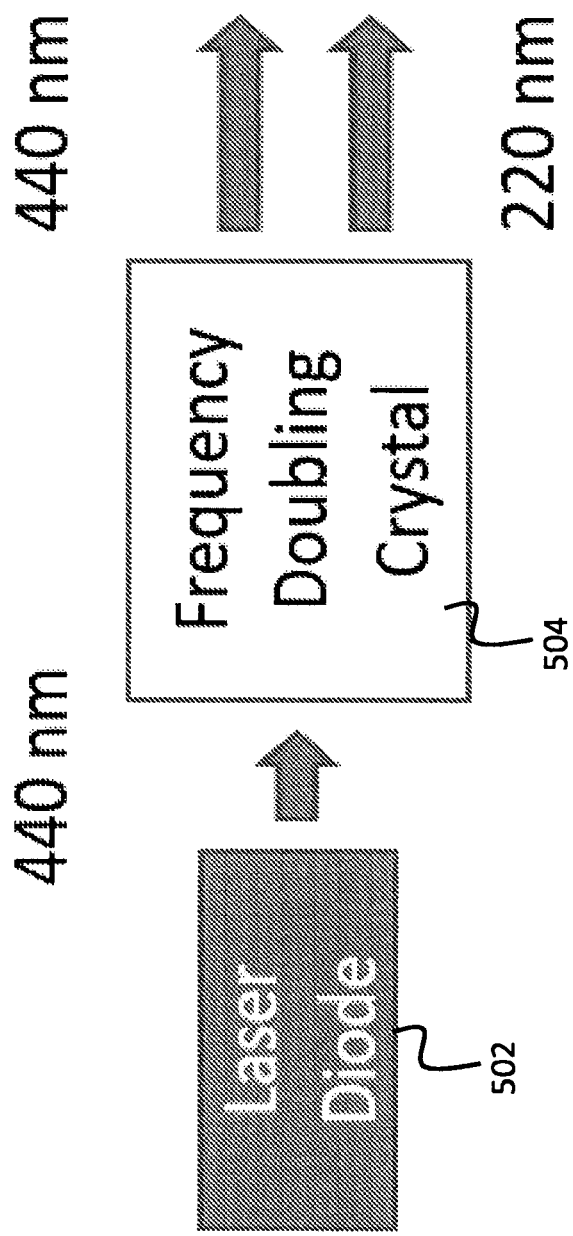

FIG. 5E illustrates the most preferred approach to generating deep-UV or far-UV (200-235 nm) radiation at present because it requires a single wavelength conversion step, that of doubling the frequency of 440 nm (blue) light from an appropriate laser diode or array 502. In a manner similar to that for the tripling of red light discussed above, an artisan might also wish to delay the step of frequency-doubling of blue light until the fiber distribution network reaches the desired location. Such a strategy minimizes the attenuation of the generated UV light by the fiber network, but has the drawback of requiring frequency-doubling optics at multiple points. As higher-quality deep-UV fiber becomes available, it will become possible to centralize all UV/visible generation and frequency-conversion steps. As noted previously, the doubling of 450 nm or 430 nm light (and wavelengths shorter, longer, and in between) is also acceptable for producing the requisite deep-UV light. This flexibility is essential because it is likely that a new wavelength will, in the future, be shown to be preferable to 222 nm (for example) for disinfection. However, because the peak wavelength of the KrCl lamp is "locked" to 222 nm by the electronic structure of the molecule, the use of other wavelengths in commercially-available disinfection systems is a moot point because lamps at other wavelengths are not widely available. However, locating the laser generator in a central location or several locations allows for lasers having sufficient power to be brought to bear on this application.

The present multiwavelength UV/visible light distribution systems and methods are considerably less expensive than the current paradigm of installing multiple lamps throughout a building. Of even greater significance, however, is the flexibility provided by the present invention because UV exposure levels and the wavelengths of radiation delivered to different rooms can be customized and controlled remotely. Furthermore, the light generation unit can be installed centrally, e.g., near the HVAC system in a building or residence so as to facilitate periodic maintenance. A photodetector installed at the output of each laser can serve as a continuous monitor of the laser output. When the output power of the laser falls to a pre-determined percentage of its initial output, the system software can be designed to notify service personnel for the need to replace or repair the unit. It must also be mentioned that the UV/visible light distribution systems described here are also valuable for applications other than disinfection and medical phototherapeutics. For example, industry employs violet and UV light for photopolymerization for manufacturing a variety of polymer-based products such as the soles of shoes, kitchen utensils, and a wide variety of products. The preferred embodiments described here are well-suited for conveying light of the desired wavelength(s) to individual manufacturing stations which often include liquid polymer vats and an optical source for the photopolymerization process. The deep-UV distribution systems described here are also of value for other photochemical processes in industry such as deep-UV photolithography and photopatterning. Preferred embodiments are able to deliver deep-UV light to multiple photolithographic stations simultaneously, for example.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A light generation and light distribution method, the method comprising:
generating laser light with a semiconductor laser or an array of semiconductor lasers at a generation location;
guiding the laser light generated by the semiconductor laser or the array of semiconductor lasers to a frequency converter, wherein the frequency converter creates one or more wavelengths for at least one or more of disinfection, medical therapy, and photochemical processes; and
directing light converted by the frequency converter to a plurality of distribution locations, wherein the plurality of distribution locations are remote from each other and the semiconductor laser or an array of semiconductor lasers, wherein remote denotes distance comparable to a distance between different rooms in a building.

2. The method of claim 1, wherein the generation location is a wall or ceiling, and the distribution locations are different rooms in a building selected from a group consisting of a hospital, office building, school, and an airport.

3. The method of claim 1, wherein the generation location is a central location and the light generated by the frequency convertor, as well as the light not converted by the frequency generator, is guided to distribution locations which are one or more of a plurality of remote locations, wherein
the frequency conversion is conducted at the central location before the guiding to remote locations with UV-transmissive fiber or microcapillaries, or is conducted near one or more of the plurality of remote locations after the guiding; and the method comprises
selectively extracting a portion of the light at one or more of the plurality of remote locations, wherein the remote locations are remote from each other and the generation location by a distance comparable to the distance between different rooms in a building; and
at one or more of the plurality of remote locations, distributing the portion of light in one or more directions via an optical distribution network so as to provide for one or more of disinfection, medical therapy, lighting, or photochemical processes.

4. The method of claim 3, wherein the guiding is conducted with one or more microcapillary, microtube, or UV-transmissive fiber optical waveguides.

5. The method of claim 3, wherein the semiconductor laser comprises an InGaN laser operating at ~440-450 nm and the optical component comprises a frequency-doubling component to provide radiation at ~220-225 nm.

6. The method of claim 3, wherein the semiconductor laser comprises an InGaN or GaN laser operating in the ~400-460 nm range and the converting is conducted with a frequency-doubling component that provides radiation at ~200-230 nm.

7. The method of claim 3, comprising limiting cumulative exposure of ~200-225 nm light at the plurality of remote locations over an eight-hour period below the standard set by the International Commission for Non-Ionizing Radiation Protection (ICNIRP).

8. The method of claim 3, wherein the semiconductor laser comprises a plurality of diode lasers operating at one or a plurality of wavelengths.

9. The method of claim 8, wherein at least one of the one or more optical components comprises a nonlinear element to double a frequency of the laser light or to generate the sum frequency of two semiconductor laser frequencies.

10. The method of claim 3, wherein the optical distribution network comprises a trunk optical guide that comprises UV-transmissive fiber or UV transmissive microcapillaries.

11. The method of claim 10, wherein the trunk optical guide comprises a plurality of UV-transmissive fibers or bundles of fibers.

12. The method of claim 10, comprising using a Y-splitter to branch one or more of the fibers or bundles of fibers from the trunk optical guide.

13. The method of claim 3, wherein the selective extracting comprises using a wavelength-selective light extraction element at one or more of the plurality of remote locations.

14. The method of claim 3, wherein the distributing comprise using a light distribution optical element at one or more of the remote locations.

15. The method of claim 14, wherein the distribution optical element comprises a fiber end configured to spray light with an optical component affixed to the end of the fiber.

16. The method of claim 14, wherein the distribution optical element comprises a fixture with passive optical components.

17. The method of claim 14, wherein the distribution optical element comprises an active optical distribution component configured to be controlled by computer operation.

18. The method of claim 3, wherein the central location is a utility location in a building and the remote locations are rooms in the building.

19. The method of claim 3, wherein the central location is a closed area servicing a public space, and the remote locations are public spaces.

20. The method of claim 3, wherein the central location is a portion of the bay of an aircraft, and the remote locations are in the pressurized cabin space.

21. The method of claim 3, wherein the remote locations comprise photopolymerization manufacturing stations requiring UV and/or visible light.

22. The method of claim 3, wherein the converting comprises generating wavelengths via frequency-doubling, tripling, or sum-frequency generation, and the remote locations receive ~200-225 nm light for disinfection and blue/violet (~400-450 nm) light and/or 610-630 nm for the treatment of infant jaundice or psoriasis, respectively.

23. The method of claim 1, wherein the distribution optical components direct light converted by the frequency converter and the light not converted by the frequency converter to one or more of the plurality of remote distribution locations.

24. A light generation and light distribution system, comprising:
 a semiconductor laser or array of lasers at a generation location;
 a frequency-conversion optical component to modify the wavelength of the radiation generated by the semiconductor laser or the array of semiconductor lasers to one or more desired UV or visible wavelengths for disinfection, medical therapy, photochemical processes, and/or lighting; and
 light extraction and distribution optical components to extract from the distribution system a portion of the light in the system so as to provide for at least one or more of one or more of disinfection, medical therapies, and photochemical processes, wherein the light extraction and distribution components are remote from each other and from the generation location, wherein remote denotes a distance comparable to the distance between different rooms in a building.

25. The system of claim 24, wherein the frequency-conversion optical component is at a central generation location that is remote from the light extraction optical components.

26. The system of claim 24, comprising conversion optical components only at the light extraction locations, wherein the generation location is central and the distribution locations are remote.

27. The system of claim 26, wherein the distribution optical components comprise microcapillaries or UV-transmissive fiber that direct UV light to the plurality of remote distribution locations.

28. The system of claim 24, wherein the extraction optical components comprise a hemispherical optical element.

* * * * *